United States Patent
Holcomb (10) Patent No.: US 11,418,103 B2
(45) Date of Patent: Aug. 16, 2022

(54) TURBOFAN JET ENGINE, POWERED BY AN ELECTRIC MOTOR WITH POWER FROM A HIGH EFFICIENCY ELECTRIC GENERATOR

(71) Applicant: HOLCOMB SCIENTIFIC RESEARCH LIMITED, Dublin (IE)

(72) Inventor: Robert Ray Holcomb, Sarasota, FL (US)

(\*) Notice: Subject to any disclaimer, the term of this patent is extended or adjusted under 35 U.S.C. 154(b) by 122 days.

(21) Appl. No.: 16/485,497

(22) PCT Filed: Feb. 16, 2018

(86) PCT No.: PCT/EP2018/053894
§ 371 (c)(1),
(2) Date: Aug. 13, 2019

(87) PCT Pub. No.: WO2018/149971
PCT Pub. Date: Aug. 23, 2018

(65) Prior Publication Data
US 2020/0052570 A1    Feb. 13, 2020

Related U.S. Application Data

(60) Provisional application No. 62/600,175, filed on Feb. 16, 2017.

(51) Int. Cl.
*H02K 53/00* (2006.01)
*H02K 7/18* (2006.01)
(Continued)

(52) U.S. Cl.
CPC .............. *H02K 53/00* (2013.01); *B60L 50/60* (2019.02); *B60L 50/90* (2019.02); *B64D 27/20* (2013.01);
(Continued)

(58) Field of Classification Search
CPC .......... H02K 53/00; H02K 7/18; H02K 11/00; H02K 31/02
(Continued)

(56) References Cited

U.S. PATENT DOCUMENTS 3,849,714 A * 11/1974 Goretzki .................. H02P 8/24
318/685
5,183,222 A    2/1993 Ramsey, Jr.
(Continued)

FOREIGN PATENT DOCUMENTS

GB             796998 A    6/1958
WO    WO-2018149971 A1    8/2018

OTHER PUBLICATIONS

International Search Report and Written Opinion, PCT/EP2018/053894, dated Jun. 4, 2018.

*Primary Examiner* — Jose A Gonzalez Quinones (57) ABSTRACT

A power system for an aircraft engine provides rotational drive to propeller driven and turbofan jet engine powered aircraft by use of a propeller or fan drive motor. Electrical power is provided to the drive motor by a high efficiency electrical power generator with reduced electromagnetic drag or reverse torque. The electric generator utilizes a solid state rotor that does not rotate which allows for power generation without reverse torque or the usual energy required to rotate the rotor inside the stator of the generator. Only the magnetic poles of the disclosed rotor rotate to generate the power. The fan blades of the turbofan jet engine are driven by the electric drive motor in which the rotor is a part of the fan as well as the drive from the high pressure turbine.

11 Claims, 5 Drawing Sheets

(51) Int. Cl.
*H02K 11/00* (2016.01)
*H02K 31/02* (2006.01)
*B60L 50/60* (2019.01)
*B60L 50/90* (2019.01)
*B64D 27/20* (2006.01)
*B64D 27/24* (2006.01)
*B64D 29/04* (2006.01)
*B64D 33/02* (2006.01)
*B64D 27/02* (2006.01)

(52) U.S. Cl.
CPC ............. *B64D 27/24* (2013.01); *B64D 29/04* (2013.01); *B64D 33/02* (2013.01); *H02K 7/18* (2013.01); *H02K 11/0094* (2013.01); *H02K 31/02* (2013.01); *B60L 2200/10* (2013.01); *B64D 2027/026* (2013.01)

(58) Field of Classification Search
USPC .................................. 310/40 R, 49.43, 49.54
See application file for complete search history.

(56) References Cited

U.S. PATENT DOCUMENTS

| | | |
|---|---|---|
| 5,239,217 A | 8/1993 | Horst |
| 8,723,344 B1* | 5/2014 | Dierickx .............. H02K 7/1846 290/1 R |
| 9,143,023 B1* | 9/2015 | Uskert ..................... H02K 1/12 |
| 2006/0131975 A1 | 6/2006 | Lee et al. |
| 2007/0296215 A1* | 12/2007 | Dooley ................... F02C 7/275 290/28 |
| 2015/0145364 A1* | 5/2015 | Holcomb ............... H02K 53/00 310/113 |
| 2016/0152327 A1* | 6/2016 | Bertels ..................... F03D 9/25 417/423.7 |

* cited by examiner

CROSS SECTION
A—A'

TURBOFAN JET ENGINE, POWERED BY AN ELECTRIC MOTOR WITH POWER FROM A HIGH EFFICIENCY ELECTRIC GENERATOR

FIELD OF INVENTION

Structures, systems, and methods for providing rotational drive to propeller driven and turbofan jet engine powered aircraft by use of an electric drive motor which is provided electrical power from a high efficiency electrical power generator with reduced electromagnetic drag or reverse torque.

RELATED PATENT APPLICATIONS

1. High Efficiency AC DC Electric Motor, Electric Power Generating System with Variable Speed, Variable Power, Geometric Isolation and High Efficiency Conducting Elements (International Appln. No. PCT/IB2013/054184; International Pub. No. WO 2013/171728 A2);
2. Solid State Multi-Pole and Uni-Pole Electric Generator Rotor for AC/DC Electric Generators (PCT Appln. No. PCT/EP2017/079687, filed Nov. 17, 2017);
3. Compact High-Efficiency, Low-Reverse Torque Electric Power Generator Driven by a High Efficiency Electric Drive Motor (PCT Appln. No. PCT/EP2017/084100, filed Dec. 21, 2017);
4. Solid-State, Compact, High Efficiency, Electric Power Generator Battery Alternative (PCT Appln. No. PCT/EP2018/051081, filed Jan. 17, 2018); and
5. Low Reverse Torque, High Efficiency Electric Power Generators with Uni-Pole (PCT Appln. No. PCT/EP2018/053533, filed Feb. 13, 2018.

BACKGROUND

Rapid depletion of the Earth's fossil fuel sources along with environmental pollution of land, air, and water with simultaneous climate change makes obvious the clear and urgent need for alternative energy supplies that are efficient, requiring no fossil fuels and are non-polluting.

A significant contribution to safely resolving the Earth's population's demand for increasing energy consumption is to increase the efficiency of electrical power generation by removing reverse torque from a rotary electric power generator. Removal of reverse torque from rotary generators associated with converting mechanical energy into electrical power may provide an opportunity for an electrically powered, highly efficient power generation plant. Removal of reverse torque allows an alternating current (AC) or direct current (DC) generator to operate with a significant increase in efficiency, thereby driving the generator of a power generation plant with a smaller electric motor.

The World's first known electrical generator was Faraday's disk dynamo. Michael Faraday discovered the operating principle of electromagnetic generators in the years 1831-1889. His observations were later reduced into a principle called Faraday's Law written by James Clerk Maxwell. The Law states that an electromagnetic force is generated in an electrical conductor that encircles a varying magnetic flux. Faraday built the first magnetic rotary induction generator called a Faraday Disc. This first generator was a type of homo-polar generator, using a copper disc rotating between poles of a horseshoe magnet. This generator produced a small DC voltage, but high amperage. The Faraday dynamo or uni-pole (or uni-polar) generator, however, did not lend itself well to practical commercial development because of the nature of its output, i.e., very low DC voltage at extremely high current. The Faraday generator does lend itself well, however, to the study of the mechanisms of reverse torque in electrical induction machines.

Conventional generators in use today require by common definition, 1 horsepower (HP) of kinetic energy input to generate 746 watts (W) of electrical energy. This relationship of mechanical horsepower to electrical watts involves derived units of power which have evolved from observations and measurements on physical and electrical machines (as well as horses).

The term "watt" was named after James Watt, a Scottish scientist, for his work on improving the steam engine and quantifying the power of the steam engine. The unit "watt" was recognized by the Second Congress of the British Association for the Advancement of Science in 1889, concurrent with the start of commercial power production. The dynamo was the first electrical generator capable of delivering power to industry and is still an important generator in use even to this day. The dynamo uses a particular machine design and electromagnetic principles to convert mechanical rotation of magnetic poles into an alternating electric current. The first commercial power plants, which were operated in Paris in the 1870's, were designed by Zenobe Gramme. The use of electric generators made it desirable to establish a common unit for electrical power in order to conventionalize this newly evolving energy source. The watt is a derived unit of power (i.e., an algebraic combination of base units). The watt is now an approved unit of the International System of Units (SI).

As defined, 1 watt is the rate at which work is done when an object's velocity is held constant at 1 meter per second against a constant opposing force of 1 Newton.

$$W = J/S = N.M/S = Kg.M^2/S^3$$

J=Joule M=Meter N=Newton Kg=Kilogram
Joule=Work done when a force of 1 Newton is displaced through a distance of 1 Meter
1 Joule=1 watt-second, $10^7$ ergs=0.2390 calories or 0.738 foot-pound (ft-lb).

Therefore, if one mechanical horsepower is equal to 550 ft-lb per second (or 33,000 ft-lb per minute), then by definition of the watt being 0.738 ft-lb per second, 1 HP=550 ft-lb per second/0.738 ft-lb per second=745.257 W, and by definition, the electrical watt is the rate at which work is done when 1 ampere (A) of current flows through an electric potential difference of 1 volt (V):

$$W = V \times A$$

745.257 watts=27.299 V×27.299 A or any combination of amps and volts in which the product is equal to 745.257 watts. Therefore, by definition and derivation, 1 HP=746 watts.

The original work on which these units hinge was performed by James Watt who introduced the term "horsepower" when he wanted to explain how powerful his steam engines were compared to horses. After some tests (not with engines, rather with horses), he established that, on average, the horses being used could pull coal up a mine shaft at the rate of 22,000 ft-lb per minute. For whatever reason, he decided to raise this number by 50% and arrived at a number which is commonly accepted as 33,000 ft-lb per minute. So, if an engine or any rotary machine may push 33,000 lbs. of something 1 foot in 1 minute, the machine is considered a 1 HP engine.

As noted above, a conventional generator requires, by definition, 1 HP to generate 746 watts plus enough additional horsepower to turn the physical mechanisms of the rotor at proper speed to maintain the desired frequency. The horsepower required to spin the mechanism is usually about 0.2 HP in a conventional generator to generate 746 watts for a total 1.2 HP needed to generate the 746 watts, although only 0.2 HP of that energy is used to actually generate the electrical power. The remaining 1 HP, which is equal to 746 watts, is required to overcome the reverse torque or so-called "back electromotive force" (back EMF).

The back EMF or reverse torque of rotary generators in use today can best be described by reference to "Lenz's Law." It, in summary, states that when an EMF is generated by a change in magnetic flux, according to Faraday's Law, the polarity of the induced EMF is such that it produces a current whose magnetic field opposes the magnetic flux which produces it. The induced magnetic field inside a loop of wires acts to keep the magnetic flux in the loop constant. If the magnetic field B is increasing, the induced magnetic field acts in equal and opposite direction to it; if it is decreasing, the induced magnetic field acts in the direction of the applied field with equal force. In conventional generators, the rotor is stationed inside the coil loops of the stator and rotates to generate a current in the stator which in turn generates a magnetic field which is equal in force and opposite in polarity to magnetic field B. Thus, reverse torque is a product of the design or design flaw of conventional generators.

In the case of the generator of the current disclosure, the rotors are solid state and do not rotate, the magnetic poles rotate and, therefore, there is no reverse torque or pole to pole magnetic drag between the rotor and the stator. This induced pole in the stator iron is induced by current flow and is not responsible for a current flow, as is evidenced by the fact that the generator reaches full voltage prior to current going to an electrical load.

In a conventional generator, due to the reverse torque, about 85% more mechanical energy is required to turn the rotor than is required to generate power. However, in the case of the current disclosure, the generator only requires energy to excite the rotor to generate the rotating magnetic poles. Therefore, the system and method take the power required and cycles it back to drive the generator and the remaining power is usable electric power to be used for whatever purpose is required, such as powering the electric motor disclosed herein.

The Lenz losses, as noted above, are related to inductive coupling between the rotor standing poles and the stator induced poles. In addition to our current work and observations on reduction of reverse torque, Nikola Tesla published an article entitled "Notes on an Unipolar Dynamo", Nikola Tesla, The Electrical Engineer, N.Y. Sep. 2, 1891. Tesla reported upon a modification of the Faraday Dynamo design. Tesla's design varied in two major ways:
1. First, he used a magnet that was bigger in diameter than the disc, so that the magnet completely covered the disc.
2. Second, he divided the disc into sections with spiral curves out from the center of the outside edge.

The Tesla modification caused the current to make a full trip around the outside edge of the disc. Because the current is flowing in a large circle at the rim of the disc, the magnetic field created does not work against the field magnet. This modification eliminated the biggest problem of electric power generation, i.e., the reaction to every action or as is commonly called, reverse torque or back EMF.

This design change and its effect on reverse torque were accomplished by geometric isolation of the standing pole from the induced pole of the machine. In the case of the current disclosure, the rotor is static, i.e., not rotating, and, therefore, reverse torque is not an issue. The induced pole is induced by current flow which is generated by the standing pole. As noted above, the induced pole is not responsible for current flow or power generation in the induced coils. This design change removes Lenz losses produced by the induced stator poles attracting and repelling polar coupling between the stator poles and the rotor poles.

The generator's solid state rotor, disclosed herein, is virtually free of reverse torque due to four design changes when compared to the standard electric rotary generator:
1. The rotor has no moving parts.
2. The rotor does not rotate in the stator cavity.
3. The magnetic poles rotate in proper frequency and sequence to generate the desired electric power output.
4. The rotor can be used to retrofit any conventional generator—single-phase, two-phase, or three-phase.

SUMMARY

Consistent with the present disclosure, apparatus and methods are provided for an electric generator with reduced reverse torque and for an electric drive motor, which can be powered by the generator, to drive the fan of a turbofan jet engine or the propeller rotated by an electric engine of an aircraft. The high efficiency power plant allows the utilization of an electric jet engine or propeller electric engine. Without the availability of an abundant on-board electric power supply, global flight powered solely by electricity is difficult to impossible. However, with the on-board power supply discussed below, unlimited electric energy is available to power all needs of the aircraft.

The electric generator of the present disclosure utilizes a solid state rotor that does not rotate which allows for power generation without reverse torque or the usual energy required to rotate the rotor inside the stator of the generator. Only the magnetic poles of the disclosed rotor rotate to generate the power.

As noted above, both propeller driven and jet driven aircraft may be powered with the generator of the current disclosure. The propeller driven aircraft will operate by replacing the fossil fuel turbine or the internal combustion engine with an electric drive motor.

In order to operate with electric power, the jet engine must be redesigned. The turbofan jet is the most widely used jet engine in use today. This engine is very functional but burns massive amounts of jet fuel and pollutes the environment. In addition, the aircraft must carry massive amounts of jet fuel onboard in order to fly using one or more jet engines.

In the case of the electric turbofan jet engine of the current disclosure, the electric power source requires no fuel or recharge. The engine is quieter and non-polluting. In addition, the aircraft does not need to carry a heavy load of explosive fuel.

The fan blades of the turbofan jet engine disclosed herein are driven by an electric motor in which the rotor is a part of the fan as well as by the drive from the high pressure turbine. A large set of fan blades is set right in front of the inlet to the jet engine. The fan works like a propeller in that it pushes large amounts of air backward which in turn pushes the engine and, thus, aircraft forward. The air that is pushed backward is divided. A portion of the air which is pushed back goes into the engine and some of the air bypasses the engine. The fan shaft is attached to the turbojet, and the high pressure turbine drives the fan as well as the low pressure compressor. The air that is blown out the back of the engine also pushes the engine and aircraft forward while simultaneously driving the fan which also functions as a propeller.

A turboprop engine of works in the same manner as that of a turbofan jet engine except the fan is replaced by a propeller with the propeller being placed outside of the air inlet. Air is taken in through the inlet and thrust into the engine bypass as well as into the engine proper. The air in the engine is first compressed by the low pressure compressor. The low pressure compressor is driven by the built-in electric motor disclosed herein and the low pressure turbine. The propeller is driven by the built-in electric motor and the low pressure turbine. The low pressure turbine is driven by the jet stream of hot gases from the hot section of the engine. Air flows from the low pressure compressor into the high pressure compressor which compresses the air before it flows into the hot section of the engine. The high pressure compressor is powered by the high pressure turbine. The high pressure turbine and the low pressure turbine are driven by the blast of hot gases from the engine's hot section out to the rear of the jet engine.

The compressed air is fed into the hot section of the engine where it is expanded by heat from an electrical heating system, for example, high resistance calrod units, contained inside the hot section. The thrust of this engine is controlled by the motor built into the fan structure, the current flow through the calrods and thrust control flaps in the walls of the hot section.

BRIEF DESCRIPTION OF THE DRAWINGS

The accompanying drawings, which are incorporated in and constitute part of this specification, and together with the description, illustrate and serve to explain the principles of various exemplary embodiments. In the drawings, in which like reference numerals designate similar or corresponding elements, regions, and portions.

DETAILED DESCRIPTION

Embodiments herein include apparatus, systems and methods. At least some disclosed methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium(s)" should be understood to include tangible items and exclude carrier waves and transient signals.

Reference will now be made in detail to the exemplary embodiments implemented according to the disclosure, the examples of which are illustrated in the accompanying drawings. In accordance with various exemplary embodiments discussed and described herein by way of brief summary, an exemplary all-electric turbofan jet engine is powered by an exemplary electric motor which is powered by an exemplary solid state electric power plant is presented.

Figure 1:
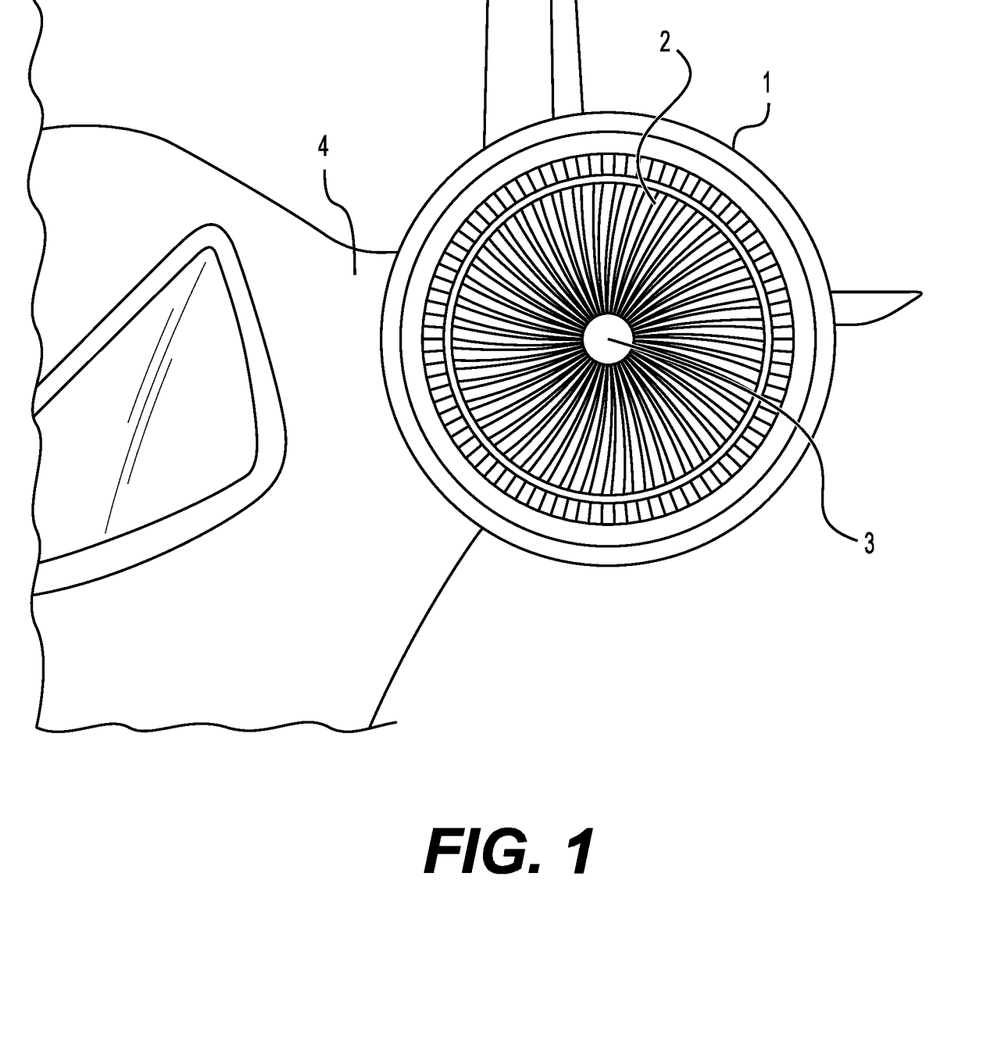
FIG. 1 is a diagram illustrating an exemplary turbofan jet engine mounted on the side of a jet aircraft, consistent with embodiments of the present disclosure.

FIG. 1 is a diagram illustrating an exemplary turbofan jet engine attached to the fuselage of, for example, a small, twin jet aircraft. Engine cowling 1 forms the intake opening for fan 3 and its fan blades 2. Attachment 4 attaches the engine to the aircraft's fuselage and serves as a conduit for power cables and controls from the aircraft to the engine.

Figure 2:
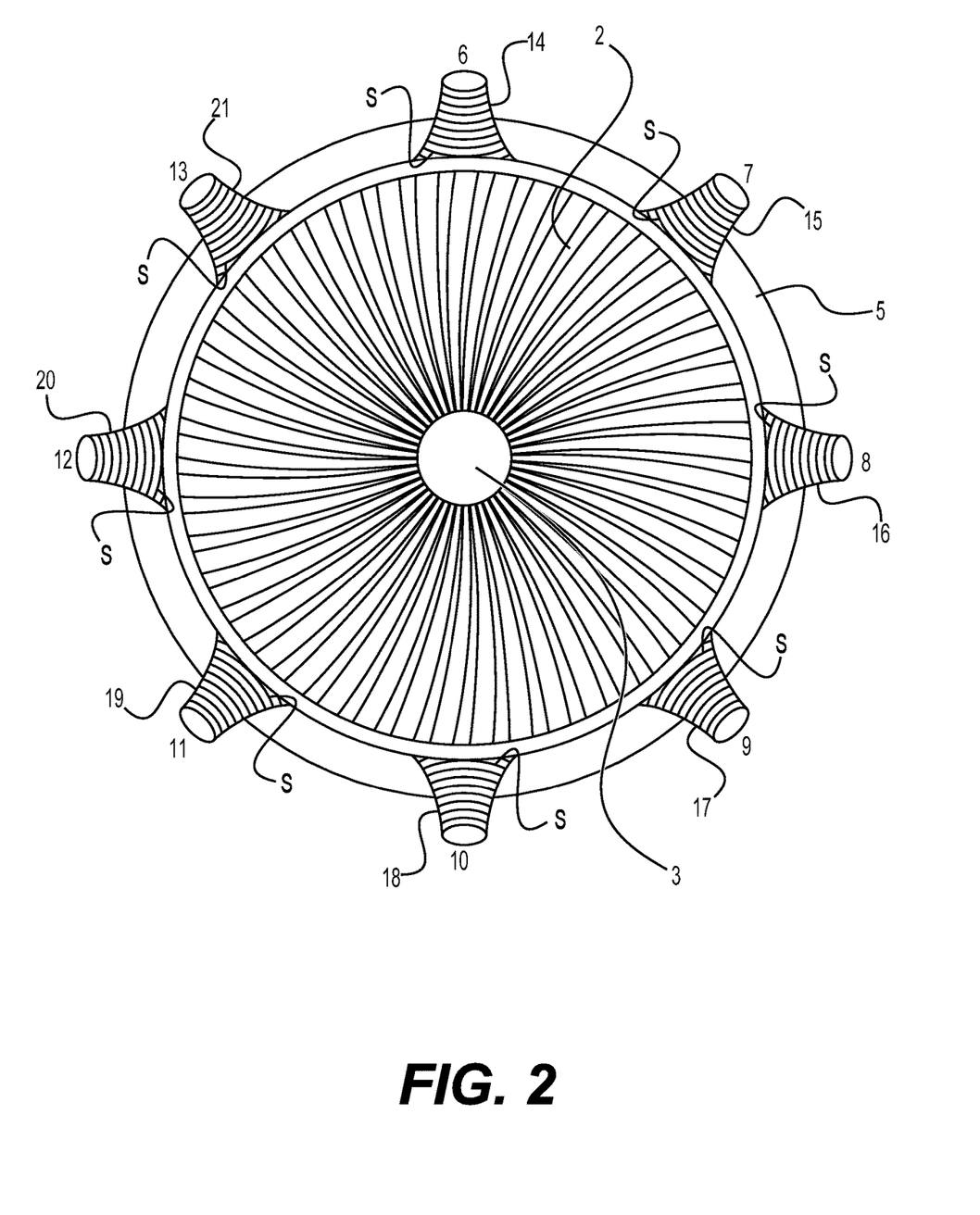
FIG. 2 is a diagram of a front view of an exemplary turbofan jet engine with the outer cowling removed revealing the fan and exemplary wound stator pole irons of an exemplary electric motor, consistent with embodiments of the present disclosure.

FIG. 2 is a diagram illustrating the front end view of an exemplary turbofan jet engine with outer cowling 1 removed, revealing motor structure 5, fan 3 and its fan blades 2, and exemplary wound stator pole irons 6-13 with coil windings 14-21 of an exemplary electric drive motor. As illustrated, the inward poles of the stators are of a first polarity (e.g., south pole).

Figure 3:
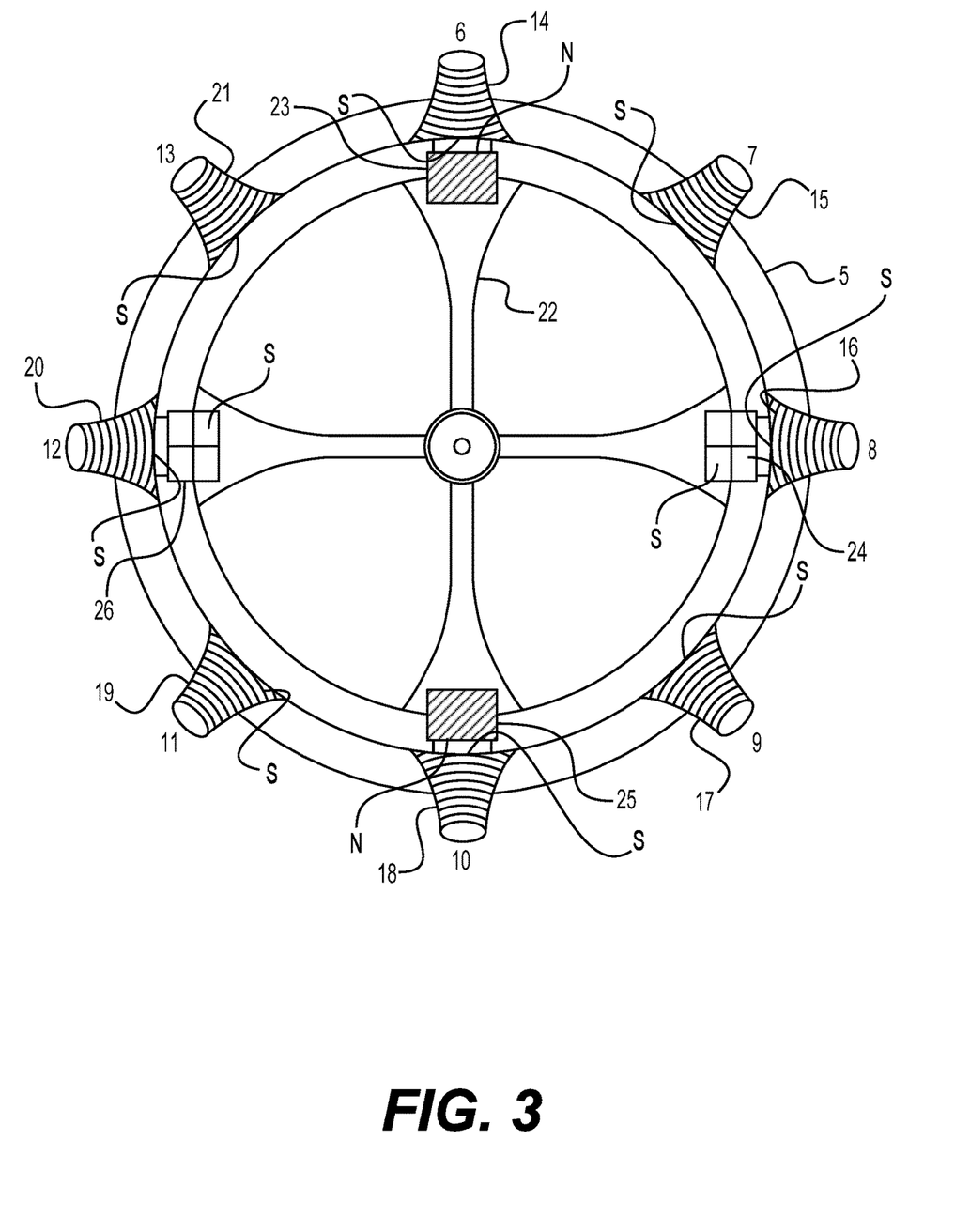
FIG. 3 is a diagram of a front view of an exemplary turbofan jet engine with the outer cowling and fan removed revealing exemplary wound pole irons of the stator and exemplary poles of the rotor of the exemplary electric motor, consistent with embodiments of the present disclosure.
Figure 4:
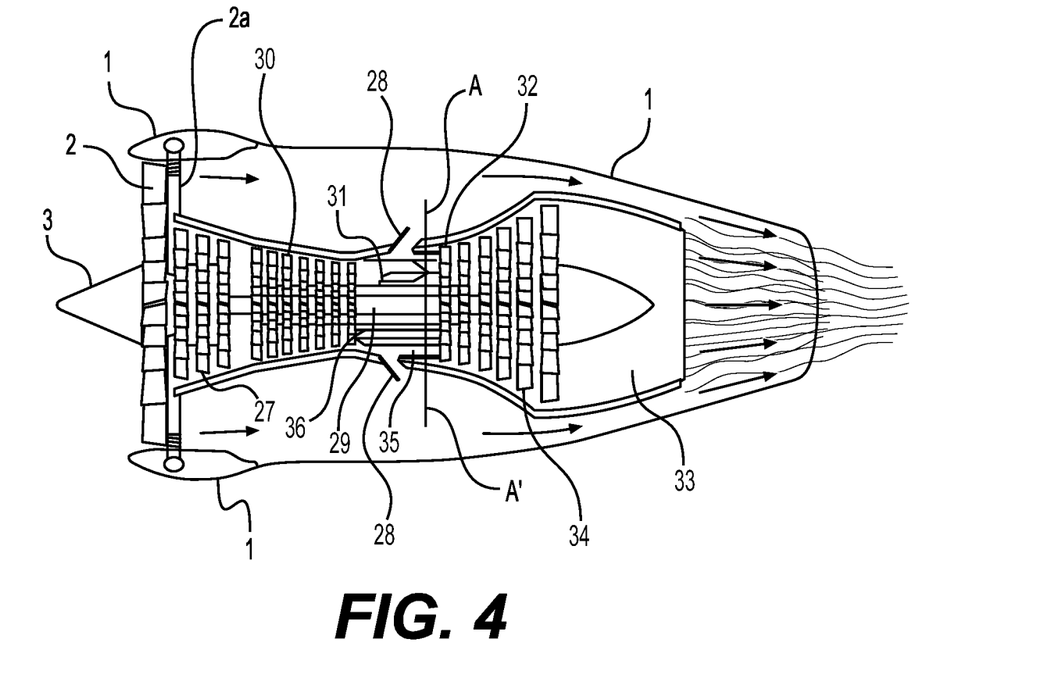
FIG. 4 is a diagram of a lateral view of an exemplary turbofan jet engine with an exemplary electric motor, consistent with embodiments of the present disclosure.

In FIG. 3, outer cowling 1 and fan 2 and its fan blades 2 are removed from the engine, revealing exemplary wound stator pole irons 6-13 with their coil windings 14-21 of FIG. 2 and exemplary rotor member 22 with rotor poles 23-26 of the exemplary electric motor 2a in FIG. 4. Rotor poles 24 and 26 facing outward toward the stator pole irons are of a first polarity (e.g., south pole) whereas rotor poles 23 and 25 facing outward are of a second polarity (e.g., north pole). The rotor magnets can be either permanent magnets or electromagnets.

The stator pole irons are activated in sequence such that they spin rotor member 22 of FIG. 3. When activated, winding coils 14-21 are sequentially activated making stator pole irons 6-13 a first polarity (south pole) facing the rotor member. The stator poles are powered with DC power from the exemplary onboard solid state power generator discussed below. The stator pole irons are excited sequentially for 0.75 milliseconds with a 0.75 collapse time. In order to reach a spin velocity of 20,000 rpm's, the following sequence is employed: Pole irons 6 and 10 are excited with DC current from a solid state excitation system, pole irons 7 and 11 are excited 0.375 milliseconds after pole irons 6 and 10, pole irons 8 and 12 are excited 0.375 milliseconds after pole irons 7 and 11, pole irons 9 and 13 are excited 0.375 milliseconds after pole irons 8 and 12 are excited, and then pole irons 6 and 10 are again excited 0.375 milliseconds following pole irons 9 and 13. This timing sequence allows rotational speeds of 20,000 rpm's. The times given above are exemplary. Appropriate timing changes are programmed into a programmable logic controller (PLC), for example, which controls the DC excitation system for variable speeds of fan 3 and low pressure compressor 27 in turbofan jet engine shown in FIG. 4.

The engine includes a fan placed in the intake of the engine draws air in by the pitch and speed of the fan, thereby forming backward thrust. The exemplary engine disclosed herein also includes a high efficiency electric drive motor which can drive the fan at variable speeds. Furthermore, air pulled into the intake of the engine by the fan is divided into two columns, one air column bypasses the jet intake and is bypassed around and out through the jet nozzle to provide thrust and the remaining intake air is taken in through the low pressure compressor. The air taken in through the intake is chilled and compressed by the low pressure compressor and pushed back into the high pressure compressor. The airflow into the high pressure compressor is compressed and pushed into the hot section of the engine containing heating rods or other electrical heating mechanisms where the compressed air expands due to the heat inside the hot section. The heat expanded air in the hot section drives the high pressure turbine which, in turn, drives the high pressure compressor and expanded air then flows through the low pressure turbine and out through the jet nozzle which results in thrust. The low pressure turbine drives the low pressure compressor and the fan. The thrust intensity can be controlled by the fan drive motor, the heat intensity of the hot section, and the thrust control flaps of the engine.

Figure 5:
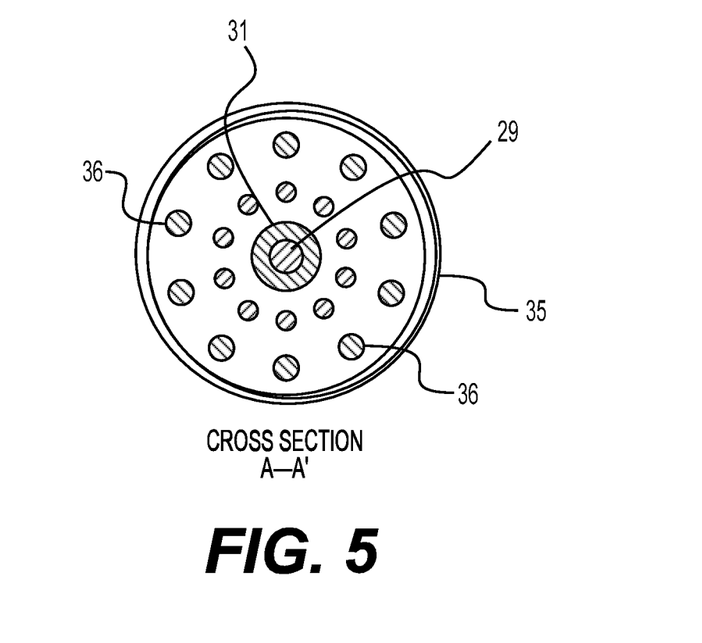
FIG. 5 is a diagram of a cross sectional view of the exemplary turbofan jet engine of FIG. 4, consistent with embodiments of the present disclosure.

In FIG. 4, high pressure compressor 30 is powered by the compressed gas in hot section 35 when the gas is expanded by the heat from the heating system, for example, exemplary high resistance heat rods or calrods 36. The expanded gas drives high pressure turbine 32 and low pressure turbine 34 and is then jetted out through nozzle 33 to provide thrust. High pressure turbine 32 drives high pressure compressor 30. The speed and thrust of the engine is controlled by the exemplary electric fan drive motor 2a, thrust control flaps 28, and the amount of current through heat rods 36 of the heating system. The cross-section A-A' of a part of the engine is illustrated in FIG. 5 which shows low pressure shaft 29, high pressure shaft 31, hot section 35, and heat rods 36.

The power supply for the engine, including its electric fan drive motor and heating system, is provided by a rotary electric generator in which the conventional dipole or multipole spinning rotor is replaced with a dipole or multi-pole static, that is, non-rotating, solid state rotor insert. The rotor creates rotating magnetic poles and generates electric power without rotating itself. Since the rotor is stationary there is no energy consuming interaction with the magnetic poles formed in the stator when the generator is connected to an electric load. Nor does the rotor require energy to spin the physical mechanism at the proper frequency.

Figure 6:
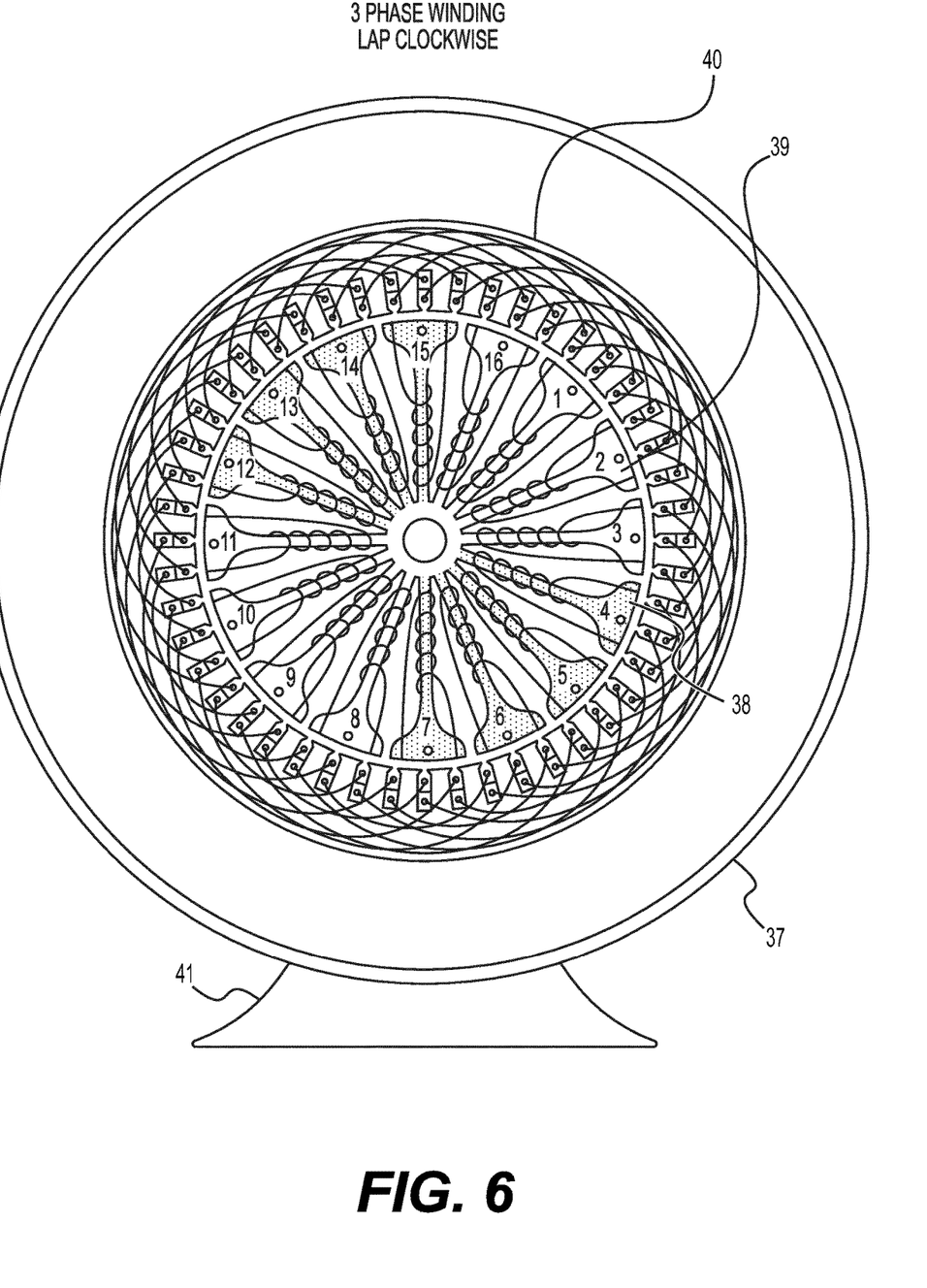
FIG. 6 is a diagram of an end view of an exemplary solid state rotor of an exemplary electric power generator which provides power to the exemplary electric motor of the turbofan jet engine, consistent with embodiments of the present disclosure.

Shown in FIG. 6 and more fully described in the PCT Application entitled "Solid State Multi-Pole and Uni-Pole Electric Generator Rotor for AC/DC Electric Generators" (PCT Appln. No. PCT/EP2017/079687, filed Nov. 17, 2017) is an exemplary high efficiency electric power generator 37 with 3-phase windings lapped clockwise. This redesign of the generator rotor is accomplished by, for example, but not limited to, cutting laminates from electrical steel in the desired diameter with salient pole pieces of equal number, size, and distribution. Exemplar rotor pole pieces 1-16 in FIG. 6 are wound with the desired and appropriate magnet wire. The magnet wire coils are each terminated in two leads which are wired to a PLC controlled excitation system. The excitation system allows sequential excitation of alternating polarity such that separated and discrete magnetic poles rotate around the periphery of the rotor parallel to the surface of the rotor, thereby generating voltage and amperage in the field coils of stator 40.

In FIG. 6, each wound salient poles in a first polarity 38 and a second polarity 39 are excited in a sequential fashion such that four discrete magnetic poles are rotated parallel to the surface of the stator 40 at the desired speed in order to generate power without experiencing reverse torque on the rotors. Generator 37 is shown attached to base 41. As noted above, the rotor remains stationary while the discrete magnetic poles rotate at the desired frequency. The high efficiency generator does not require energy to spin the rotor or to overcome reverse torque. Furthermore, it can produce the same amount of electric energy as a conventional generator with the same specifications. Additionally, as described more fully in the above referenced PCT Application, some of the energy produced by the generator can be taken back through a battery interface and used to excite the rotor pole windings.

The onboard electric power generator disclosed herein can provide energy for every electrical demand of an aircraft, including the energy required to move it in space either by use of a propeller or a jet engine. In the case of a propeller driven aircraft, the generator provides electric power to an electric drive motor which turns the propeller through a gear mechanism. And in the case of a turbofan jet engine, as discussed above, the generator provides power to an electric fan drive motor which turns the fan of the engine.

The invention claimed is:

1. An airplane engine system, comprising:
   a circular electric motor coupled to a fan of a turbofan jet engine of an airplane, the circular electric motor comprising:
   a motor support structure;
   a spin rotor member with arms radiating toward the motor support structure having four cardinal points;
   a plurality of stator pole irons wound with stator coils, wherein the stator pole irons are affixed at the cardinal points and intermediate points between the cardinal points and excited by a generator to create magnetic poles of a first polarity, wherein the generator comprises a non-rotating electromagnetic rotor that remains stationary while generating a 360° revolving polar magnetic field that powers the stator coils of the electric motor; and
   a rotor pole affixed at one end of each spin rotor member arm;
   wherein each rotor pole faces outwards towards the stator pole irons axially aligned with the rotor poles, and wherein rotor poles at first opposite cardinal points are at a first polarity and the rotor poles at the other opposite cardinal points are at a second polarity.

2. The engine system of claim 1, wherein the revolving polar magnetic field is emitted sequentially from salient poles of the generator and moves parallel to a surface of a stator of the generator in a 360° circular motion as either a uni-pole, dipole, or four-pole configuration, wherein the non-rotating electromagnetic rotor is placed inside the stator of the generator and electric power leads from the generator are connected to the stator coils of the electric drive motor to excite the stator pole irons of the electric drive motor with at least a portion of the generated electric power being sent to a storage device where a portion of the stored power is utilized to re-excite the non-rotating electromagnetic rotor of the generator.

3. The engine system of claim 1, wherein the stator pole irons are activated in sequence for spinning the spin rotor member.

4. The engine system of claim 1, wherein each rotor pole is magnetized using a permanent magnet or an electromagnetic magnet.

5. The engine system of claim 1, wherein the circular electric motor is configured to spin the fan blades at variable speeds.

6. A generator coupled to a circular electric motor affixed to a fan of a turbofan jet engine of an airplane, the circular electric motor comprising:
 a motor support structure;
 a spin rotor member with arms radiating toward the motor support structure having four cardinal points; and
 a plurality of stator pole irons wound with stator coils, each stator pole iron being affixed at the cardinal points and intermediate points between the cardinal points;
wherein the generator comprises a non-rotating electromagnetic rotor that remains stationary while generating a 360° revolving polar magnetic field that powers the plurality of wound stator pole irons to sequentially excite windings on each stator pole iron such that a pair of stator pole irons opposite each other are each excited for a fixed or variable time after which a next pair of stator pole irons opposite each other are excited in a clockwise direction until all opposite pairs are excited and the process continues to maintain a desired spin velocity of the turbofan jet engine.

7. The generator of claim 6, wherein the revolving polar magnetic field is emitted sequentially from salient poles of the generator and moves parallel to a surface of a stator of the generator in a 360° circular motion as either a uni-pole, dipole, or four-pole configuration, wherein the non-rotating electromagnetic rotor is placed inside the stator of the generator and electric power leads from the generator are connected to the stator coils of the electric motor to excite the stator pole irons of the electric motor with at least a portion of the generated electric power being sent to a storage device where a portion of the stored power is utilized to re-excite the non-rotating electromagnetic rotor of the generator.

8. A turbofan jet engine, wherein the engine comprises:
 an outer cowling;
 a motor structure with a stator of a circular electric drive motor with stator pole irons attached, stator coils wound on the stator pole irons;
 a fan and fan blades, and a rotor coupled to the fan wherein the fan blades are configured to spin at a variable speed by deriving power from the circular electric motor;
 wherein the stator coils of the stator are excited by a generator, the generator comprising a non-rotating electromagnetic rotor that remains stationary while generating a 360° revolving polar magnetic field.

9. The engine of claim 8, wherein the revolving polar magnetic field is emitted sequentially from salient poles of the generator and moves parallel to a surface of a stator of the generator in a 360° circular motion as either a uni-pole, dipole, or four-pole configuration, wherein the non-rotating electromagnetic rotor is placed inside the stator of the generator and electric power leads from the generator are connected to the stator coils of the electric motor to excite the stator pole irons of the electric motor with at least a portion of the generated electric power being sent to a storage device where a portion of the stored power is utilized to re-excite the non-rotating electromagnetic rotor of the generator.

10. A circular electric drive motor coupled to a turbofan jet engine of an airplane, the circular electric motor comprising:
 a motor support structure;
 a spin rotor member with arms radiating toward the motor support structure having four cardinal points; and
 a plurality of stator pole irons wound with stator coils, wherein a stator pole iron is affixed at each cardinal point and an intermediate point on the motor support structure and sequentially electrically activated by a generator coupled to the stator coils for magnetizing the stator pole irons;
 wherein the generator comprises a non-rotating electromagnetic rotor that remains stationary while generating a 360° revolving polar magnetic field.

11. The electric drive motor of claim 10, wherein the revolving polar magnetic field is emitted sequentially from salient poles of generator and moves parallel to a surface of a stator of the generator in a 360° circular motion as either a uni-pole, dipole, or four-pole configuration, wherein the non-rotating electromagnetic rotor is placed inside the stator of the generator and electric power leads from the generator are connected to the stator coils of the electric motor to excite the stator pole irons of the electric motor with at least a portion of the generated electric power being sent to a storage device where a portion of the stored power is utilized to re-excite the non-rotating electromagnetic rotor of the generator.

\* \* \* \* \*